United States Patent
Zhu et al.

(10) Patent No.: US 12,231,263 B2
(45) Date of Patent: Feb. 18, 2025

(54) METHOD AND DEVICE FOR ADVERTISING INFORMATION IN BRIDGE NETWORK AND COMMON ATTRIBUTES MANAGEMENT COMPONENT

(71) Applicant: ZTE CORPORATION, Guangdong (CN)

(72) Inventors: Xiangyang Zhu, Guangdong (CN); Yufang Han, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 437 days.

(21) Appl. No.: 17/620,112

(22) PCT Filed: May 28, 2020

(86) PCT No.: PCT/CN2020/093031
§ 371 (c)(1),
(2) Date: Dec. 16, 2021

(87) PCT Pub. No.: WO2021/012782
PCT Pub. Date: Jan. 28, 2021

(65) Prior Publication Data
US 2022/0368562 A1  Nov. 17, 2022

(30) Foreign Application Priority Data
Jul. 22, 2019 (CN) .......................... 201910662470.7

(51) Int. Cl.
*H04L 12/46* (2006.01)
(52) U.S. Cl.
CPC ...... *H04L 12/4633* (2013.01); *H04L 12/4641* (2013.01)

(58) Field of Classification Search
CPC ............. H04L 12/4633; H04L 12/4641; H04L 12/462; H04L 69/28; H04L 69/03; H04L 2212/00
See application file for complete search history.

(56) References Cited

U.S. PATENT DOCUMENTS

| | | | |
|---|---|---|---|
| 2003/0076845 A1 | 4/2003 | Yokota et al. | |
| 2005/0160161 A1 | 7/2005 | Barrett et al. | |
| (Continued) | | | |

FOREIGN PATENT DOCUMENTS

| | | |
|---|---|---|
| CN | 101252514 | 8/2008 |
| CN | 103220221 A | 7/2013 |
| (Continued) | | |

OTHER PUBLICATIONS

Decision to Grant a Patent (w/ English translation) for corresponding JP Application No. 2021-569506, dated Jul. 13, 2023, 3 pages.

(Continued)

*Primary Examiner* — Luat Phung
(74) *Attorney, Agent, or Firm* — Dority & Manning, P.A.

(57) ABSTRACT

Provided in the present disclosure are a method and device for advertising information in a bridge network, a common attributes management component and a computer-readable storage medium. The CAMC is configured at each port of each node of the bridge network and is configured between a link-local registration protocol (LRP) application and an LRP. The method includes: the CAMC receives first common attribute information advertised by the LRP application and writes the first common attribute information into a database of the LRP; the CAMC receives second common attribute information reported by the database of the LRP and reports the second common attribute information to the LRP application.

20 Claims, 10 Drawing Sheets

(56) References Cited

U.S. PATENT DOCUMENTS

| | | | |
|---|---|---|---|
| 2008/0232299 A1 | 9/2008 | Mosig | |
| 2008/0240106 A1 | 10/2008 | Schlenk | |
| 2011/0103509 A1 | 5/2011 | Chen et al. | |
| 2012/0170489 A1* | 7/2012 | Farkas | H04L 45/04 370/256 |
| 2012/0207183 A1 | 8/2012 | Bobrek et al. | |
| 2021/0029228 A1* | 1/2021 | Cheng | G06F 16/27 |
| 2022/0078076 A1* | 3/2022 | Chen | H04L 69/329 |
| 2022/0368562 A1* | 11/2022 | Zhu | H04L 69/03 |

FOREIGN PATENT DOCUMENTS

| | | | |
|---|---|---|---|
| CN | 103973825 A | 8/2014 | |
| CN | 104620550 A | 5/2015 | |
| CN | 105306613 A | 2/2016 | |
| CN | 108293072 A | 7/2018 | |
| EP | 3958509 A1 | 2/2022 | |
| KR | 20170066295 A | 6/2017 | |
| WO | 2018162071 A1 | 9/2018 | |

OTHER PUBLICATIONS

ZTE Corporation, International Search Report with English Translation, PCT/CN2020/093031, Aug. 26, 2020, 5 pgs.

Time-Sensitive Networking Task Group of IEEE 802.1 of the LAN MAN Standards Committee of the IEEE Computer Society, "IEEE P802.1 CS/D2.0 Draft Standard for local and metropolitan area networks-Link-local Registration Protocol," IEEE Standards Association, Dec. 6, 2018, 146 pgs.

Tao Huang et al., "Survey of the deterministic network," Journal on Communications, Jun. 25, 2019, 18 pgs.

Feng Chen, "Resource Allocation Protocol (RAP) based on LRP for Distributed Configuration of Time-Sensitive Streams," Time-Sensitive Networking Task Group, Nov. 2017, 21 pgs.

Chinese First Office Action (w/ English translation) for corresponding Chinese Application No. 201910662470.7, issued Sep. 30, 2022, 13 pages.

ZTE Corporation, Extended European Search Report, EP 20844110.5, May 9, 2022, 11pgs.

LAN Man Standards Committee of the IEEE Computer Society, "Draft Standard for Local and Metropolitan Area Networks⇒Link-local Registration Protocol", IEEE Draft, 802-1CS-D2-2, IEEE-SA, Piscataway, NJ USA, vol. 802.1cs draft, No. d2,\ (Retrieved from the Internet: URL:http://grouper.ieee.org/groups/802/1/files/private/cs-drafts/d2/802-1CS-d2-2.pdf), Jul. 12, 2019, 157 pgs.

Korean Notice of Allowance (w/ English translation) for corresponding Application No. 10-2021-7038277, dated Jul. 23, 2024, 10 pages.

* cited by examiner

| Field | Length (octets) | Offset (octets) |
|---|---|---|
| Type | 1 | 0 |
| Length | 2 | 1 |
| My Portal Number | 4 | 3 |
| Zero or more records | Variable | 7 Variable |

FIG. 1

| Field | Length (octets) | Offset (octets) |
|---|---|---|
| Record number | 4 | 0 |
| Sequence Number | 4 | 4 |
| Checksum | 2 | 8 |
| Date length | 2 | 10 |
| Application data | 0 to 65520 | 12 Variable |

FIG. 2

```
+-+-+-+-+-+-+-+-+-+-+-+-+-+-+-+-+-+-+-+-+-+-+-+-+-+-+-+-+-+-+-+-+
|          Type(TBD)            |            Length             |
+-+-+-+-+-+-+-+-+-+-+-+-+-+-+-+-+-+-+-+-+-+-+-+-+-+-+-+-+-+-+-+-+
|                          Data Value                           |
+-+-+-+-+-+-+-+-+-+-+-+-+-+-+-+-+-+-+-+-+-+-+-+-+-+-+-+-+-+-+-+-+
                                (a)
+-+-+-+-+-+-+-+-+-+-+-+-+-+-+-+-+-+-+-+-+-+-+-+-+-+-+-+-+-+-+-+-+
|           Type(1)             |           Length(1)           |
+-+-+-+-+-+-+-+-+-+-+-+-+-+-+-+-+-+-+-+-+-+-+-+-+-+-+-+-+-+-+-+-+
|   SRclassId   |
+-+-+-+-+-+-+-+-+
+-+-+-+-+-+-+-+-+-+-+-+-+-+-+-+-+-+-+-+-+-+-+-+-+-+-+-+-+-+-+-+-+
|           Type(2)             |           Length(1)           |
+-+-+-+-+-+-+-+-+-+-+-+-+-+-+-+-+-+-+-+-+-+-+-+-+-+-+-+-+-+-+-+-+
|SRclassPriority|
+-+-+-+-+-+-+-+-+
+-+-+-+-+-+-+-+-+-+-+-+-+-+-+-+-+-+-+-+-+-+-+-+-+-+-+-+-+-+-+-+-+
|           Type(3)             |           Length(1)           |
+-+-+-+-+-+-+-+-+-+-+-+-+-+-+-+-+-+-+-+-+-+-+-+-+-+-+-+-+-+-+-+-+
|TransSelection |
+-+-+-+-+-+-+-+-+
+-+-+-+-+-+-+-+-+-+-+-+-+-+-+-+-+-+-+-+-+-+-+-+-+-+-+-+-+-+-+-+-+
|           Type(4)             |           Length(1)           |
+-+-+-+-+-+-+-+-+-+-+-+-+-+-+-+-+-+-+-+-+-+-+-+-+-+-+-+-+-+-+-+-+
|ClassMeaInterv |
+-+-+-+-+-+-+-+-+
+-+-+-+-+-+-+-+-+-+-+-+-+-+-+-+-+-+-+-+-+-+-+-+-+-+-+-+-+-+-+-+-+
|           Type(5)             |           Length(2)           |
+-+-+-+-+-+-+-+-+-+-+-+-+-+-+-+-+-+-+-+-+-+-+-+-+-+-+-+-+-+-+-+-+
|     SRClassMaxFrameSize       |
+-+-+-+-+-+-+-+-+-+-+-+-+-+-+-+-+
+-+-+-+-+-+-+-+-+-+-+-+-+-+-+-+-+-+-+-+-+-+-+-+-+-+-+-+-+-+-+-+-+
|           Type(6)             |           Length(4)           |
+-+-+-+-+-+-+-+-+-+-+-+-+-+-+-+-+-+-+-+-+-+-+-+-+-+-+-+-+-+-+-+-+
|                    SRClassTargetMaxLatency                    |
+-+-+-+-+-+-+-+-+-+-+-+-+-+-+-+-+-+-+-+-+-+-+-+-+-+-+-+-+-+-+-+-+
                                (b)
```

METHOD AND DEVICE FOR ADVERTISING INFORMATION IN BRIDGE NETWORK AND COMMON ATTRIBUTES MANAGEMENT COMPONENT

CROSS REFERENCE TO RELATED APPLICATIONS

The present application is a United States National Stage Application filed under 35 U.S.C. § 371 of PCT Patent Application Serial No. PCT/CN2020/093031, filed May 28, 2020, which claims priority to Chinese Patent Application No. CN201910662470.7, filed Jul. 22, 2019, each of which is incorporated by reference herein in its entirety.

TECHNICAL FIELD

The present disclosure relates to, but is not limited to, a method and a device for advertising information in a bridge network, a common attributes management component and a computer-readable storage medium.

BACKGROUND

The link local registration protocol (LRP) is proposed by the time sensitive network (TSN) working group of the institute of electrical and electronics engineers (IEEE), is used for rapidly and reliably distributing information in the network hop by hop and has the advantages of excellent extensibility and supporting of 1 MByte level data transmission. Various application protocols or components can be defined on the link local registration protocol. These applications are loosely coupled with the LRP, define attribute values and semantics respectively, only use the LRP as a data transmission channel, and declare and propagate attributes by calling the service primitives provided by the LRP.

SUMMARY

The following is a summary of a subject that is described in detail herein, which is not intended to limit the scope of protection of the claims.

Some embodiments of the present disclosure provide a method and a device for advertising information in a bridge network, a common attributes management component and a computer-readable storage medium.

Some embodiments of the present disclosure provide a method for advertising information in a bridge network. A common attributes management component (CAMC) is configured at each port of each node of the bridge network and is configured between a link-local registration protocol (LRP) application and an LRP. The method includes: the CAMC receives first common attribute information advertised by the LRP application and writes the first common attribute information into a database of the LRP; and the CAMC receives second common attribute information reported by the database of the LRP and reports the second common attribute information to the LRP application, where the first common attribute information is common attribute information needing to be advertised by the LRP application, and the second common attribute information is common attribute information needing to be synchronized when the database of the LRP is changed.

Some embodiments of the present disclosure provide the CAMC. The CAMC is configured between an LRP application and an LRP at each port of each node of a bridge network. The CAMC includes a CAMC attribute declaration entity (CADE), a CAMC coding and decoding entity (CCDE), and a CAMC attribute registration entity (CARE). The CADE is configured to receive first common attribute information advertised by the LRP application and send the first common attribute information to the CCDE. The CCDE is configured to encapsulate the first common attribute information into a TLV format and write the first common attribute information with a TLV encapsulation format into a database of the LRP; and receive second common attribute information with a TLV encapsulation format reported by the database of the LRP, decapsulate the second common attribute information with the TLV encapsulation format, and send the decapsulated second common attribute information to the CARE. The CARE is configured to report the second common attribute information to the LRP application. The first common attribute information is common attribute information needing to be advertised by the LRP application, and the second common attribute information is common attribute information needing to be synchronized when the database of the LRP is changed.

Some embodiments of the present disclosure further provide a device for advertising information in a bridge network. The device includes a memory, a processor and a computer program stored in the memory and executable by the processor, where the processor implements the method for advertising information in a bridge network when executing the computer program.

Some embodiments of the present disclosure further provide a computer-readable storage medium. The computer-readable storage medium stores a computer-executable instruction, where the computer-executable instruction is executable to perform the method for advertising information in a bridge network.

In the embodiments of the present disclosure, the CAMC is configured at each port of each node of the bridge network and is configured between the LRP application and the LRP. The CAMC receives the first common attribute information advertised by the LRP application and writes the first common attribute information into the database of the LRP. The CAMC receives the second common attribute information reported by the database of the LRP and reports the second common attribute information to the LRP application. The first common attribute information is the common attribute information needing to be advertised by the LRP application, and the second common attribute information is the common attribute information needing to be synchronized when the database of the LRP is changed. In the embodiments of the present disclosure, the common attribute information is uniformly transmitted and propagated by the CAMC, such that on one hand, a plurality of LRP applications may share the common attribute information without additional definition, and on the other hand, when a plurality of LRP applications on the same port need to advertise the same common attribute information, the same common attribute information only needs to be advertised once, thereby avoiding waste of resources.

Other aspects may be apparent upon reading and understanding the accompanying drawings and detailed description.

BRIEF DESCRIPTION OF THE DRAWINGS

FIG. 1 is a schematic diagram of an encapsulation format of a record link-local registration protocol data unit (LRPDU) of some embodiments of the present disclosure.

FIG. 2 is a schematic diagram of a coding format of each record of some embodiments of the present disclosure.

FIG. 15 is a schematic diagram of (a) and (b) being a TLV coding format of some embodiments of the present disclosure.

DETAILED DESCRIPTION

Figure 3:
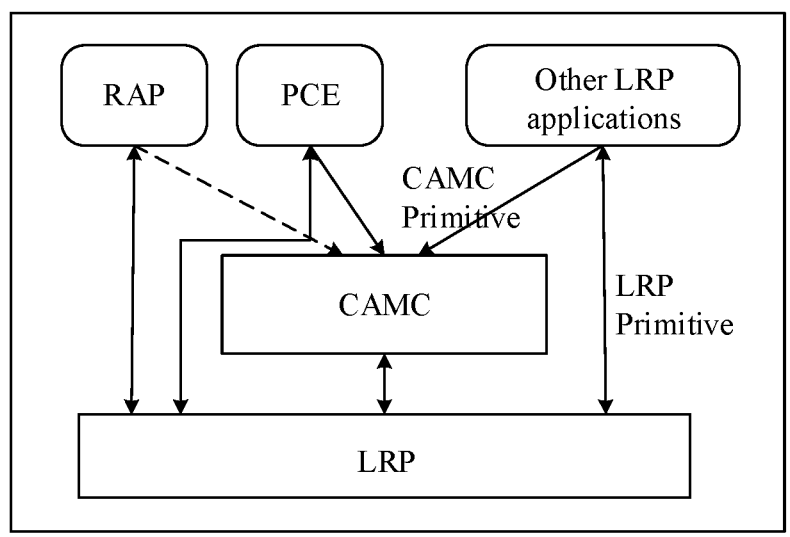
FIG. 3 is a relational schematic diagram of a common attributes management component (CAMC), a link-local registration protocol (LRP), and an LRP application of the embodiment of the present disclosure.

Embodiments of the present disclosure are described in detail below in conjunction with the accompanying drawings.

Steps shown in the flow chart of the accompanying drawings may be executed, for example, by a set of computer-executable instructions in a computer system. Although a logical sequence is shown in the flow chart, in some cases, the steps shown or described may be executed in a sequence different from that stated herein.

The inventors find that: various LRP-based applications may need to advertise some common information in the bridge network. For example, the resource allocation protocol (RAP) needs to advertise a stream reservation (SR), a class, a queue transmission selection algorithm, a queue class measure interval and other information between nodes in the network to establish the SR domain, and then allocate resources on the basis of the SR domain, while other protocols may also need to perform operation on the basis of the SR domain. However, so far, SR domain information advertisement is coupled with RAP together. When using SR domain information, other protocols further need to additionally define and advertise the information, which may cause inconsistency of specifications and waste of network resources.

In order to provide various application-independent common information advertisement services for a link-local registration protocol (LRP) application, some embodiments of the present disclosure provide, on the basis of an LRP, a component called as a common attributes management component (CAMC). The component is used as a public component for advertising various common information in a TLV (Type, Length, Value) coding format based on a record link-local registration protocol data unit (LRPDU) in a bridge network, and provides information advertisement services for other protocols or components.

The CAMC is provided at each port of each node of the bridge network, and is provided between the LRP application and the LRP.

In the bridge network, there may be a lot of common information needing to be advertised. For example, remaining available resources of a port bandwidth may be used by a resource allocate protocol (RAP) or may be used by a path computation element (PCE) as a basis for path computation. Various kinds of information that may be advertised by the CAMC are listed in the embodiment of the present disclosure and include, but not limited to, contents listed in table 1 below.

TABLE 1

List of common information that may be advertised by CAMC

| Parameter Type | Parameter List |
| --- | --- |
| Feature Level | Management protocol: network configuration protocol (NETCONF), representational state transfer configuration protocol (RESTCONF), simple network management protocol (SNMP) V1, stream reservation protocol (SRP), message session relay protocol (MSRP), resource allocate protocol (RAP) |
| | Clock protocol: 1588 v1, 1588 power profile, 802.1AS, Roles (master, slave) |
| | Security protocol: 802.1X |
| | Other protocols: link layer discovery protocol (LLDP), spanning tree protocol (STP), rapid spanning tree protocol (RSTP) |
| | Feature mechanism: Qbv, Qbu, 1CB, Qav, Qci, Qch, Qcr, Strict priority, Cut-through, Security(Media Access Control Security, MACsec) |
| Parameter Level | port number |
| | maximum Nr of virtual local area network (VLAN) |
| | re-mark, removal and addition of VLAN |
| | dependentDelayMin/Max |
| | independentDelayMin/Max |
| | frame buffer |
| | frame block granularity |
| | maximum of streams |
| | the number of filter and policy entries per stream |
| | the number of destination MAC entries supported by a file data buffer |
| | supported stream identification function |
| | Qbu (frame preemption) - minimum frame size |
| | RS domain - RS class, timeInterval, etc. |
| | port bandwidth, remaining available bandwidth, allocated bandwidth |
| | port processing delay |
| | the number of queues |
| | maximum of queue entries |
| | queue delay |
| | queue transmission selection algorithm |
| | Qbv |
| | maximum of gate events |
| | Min/Max AdminCycleTime |
| | granularity |
| | 1CB |
| | Sequencing |
| | Splitting |
| | Recovery |

Information needing to be advertised is coded in a TLV format and carried by the LRPDU, and in various LRPDUs that have been defined by the LRP, the record LRPDU is used for carrying data. An encapsulation format of the record LRPDU is shown in FIG. 1, each record LRPDU may carry zero or more records, and a coding format of each record is shown in FIG. 2, where each field of application data may be used for carrying a plurality of TLVs of the information needing to be advertised. The TLV coding format of each piece of information may be selected according to actual needs or from the existing art, which is not repeatedly described in the embodiment of the present disclosure.

The CAMC may provide advertisement services of common information for the plurality of LRP applications, and the plurality of LRP applications may also advertise respective specific attribute information. FIG. 3 shows the relational schematic diagram of application protocols or components of the CAMC, the LRP and other LRPs, a common attribute of each LRP application may be selected to be advertised by the CAMC (a dotted line with an arrow), and a specific attribute of each LRP application may be advertised by itself (a solid line with an arrow). For example, the SR domain attribute of the RAP may be selected to be advertised by a CAMC protocol, and attributes related to RAP resource allocation are defined by themselves and advertised by calling LRP primitives.

Contents defined in the CAMC include:
1. A type, value and an associated semantic of each common attribute, which represent various information needing to be advertised, for example, the attribute type being "queue transmission selection algorithm" and the attribute value being 1, which represent a credit-based shaper (CBS) algorithm.
2. A TLV coding format used for carrying various attribute types and values in the record LRPDU.
3. A specific appID of the CAMC.
4. Three primitives, that is, an information advertisement service primitive, an information query service primitive and an information report primitive being provided for other LRP applications or components of the RAP, the PCE, etc. on the CAMC. Applications of the RAP, etc. may call an information query service primitive to query whether certain information of the port has been advertised and information advertised by other ports, and when the plurality of applications on the same port need to advertise the same information listed in table 1, the same information only needs to be advertised once, thereby avoiding waste of resources.

Figure 4:
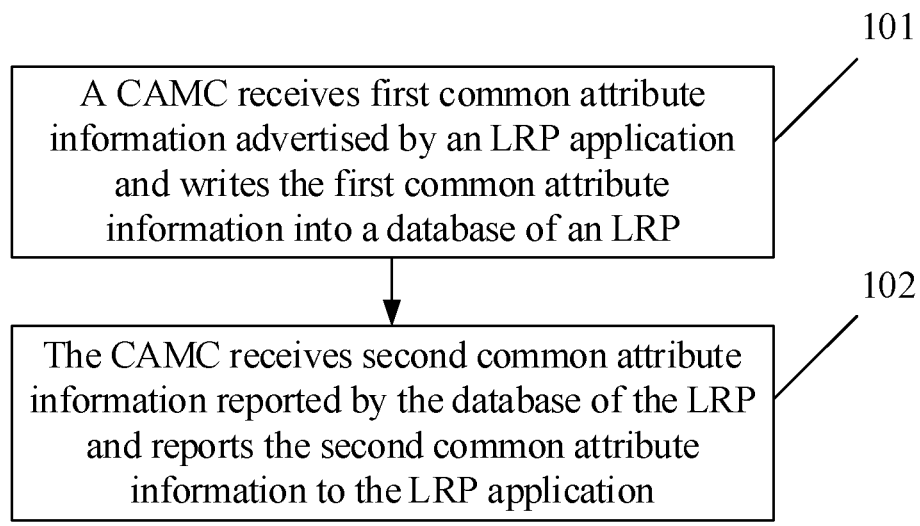
FIG. 4 is a flow chart of a method for advertising information in a bridge network of some embodiments of the present disclosure.

FIG. 4 shows a method for advertising information in a bridge network of some embodiment of the present disclosure.

In step 101, the CAMC receives first common attribute information advertised by the LRP application and writes the first common attribute information into a database of the LRP.

The first common attribute information is common attribute information needing to be advertised by the LRP application.

Figure 5:
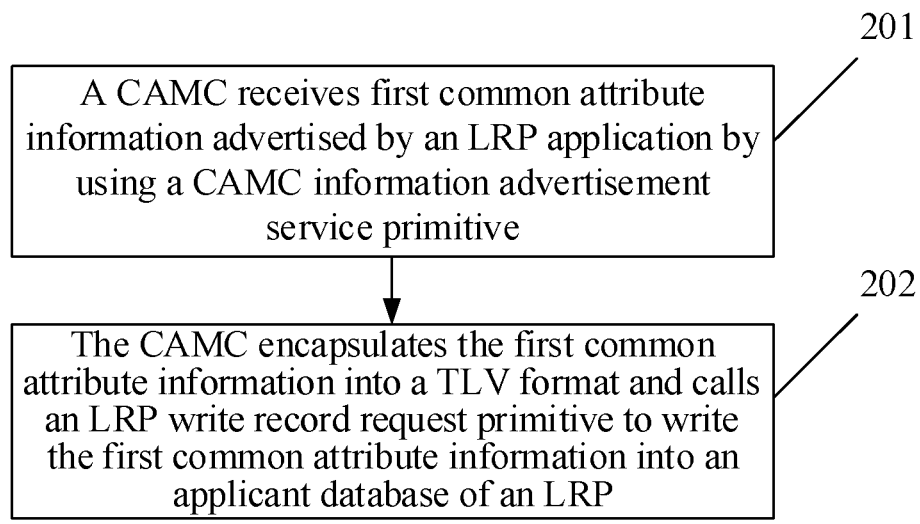
FIG. 5 is a flow chart of step 101 of some embodiments of the present disclosure.

As shown in FIG. 5, in one embodiment, the step 101 may include following steps.

In step 201, the CAMC receives the first common attribute information advertised by the LRP application by using a CAMC information advertisement service primitive.

In step 202, the CAMC encapsulates the first common attribute information into a TLV format and calls an LRP write record request primitive to write the first common attribute information into an applicant database of the LRP.

During encapsulation, the first common attribute information and the information of the port are encapsulated together and sent to the applicant database of the LRP.

In step 102, the CAMC receives second common attribute information reported by the database of the LRP and reports the second common attribute information to the LRP application.

The second common attribute information is common attribute information needing to be synchronized when the database of the LRP is changed.

Figure 6:
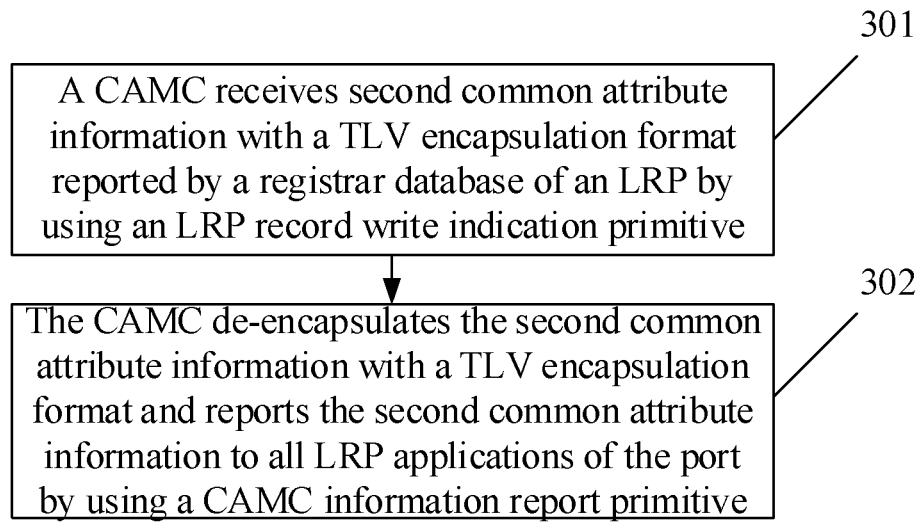
FIG. 6 is a flow chart of step 201 of some embodiments of the present disclosure.

As shown in FIG. 6, in one embodiment, step 102 includes following steps.

In step 301, the CAMC receives the second common attribute information with a TLV encapsulation format reported by a registrar database of the LRP by using an LRP record write indication primitive.

In step 302, the CAMC decapsulates the second common attribute information with the TLV encapsulation format and report the second common attribute information to all LRP applications of the port by using a CAMC information report primitive.

It should be noted that the step 101 and the step 102 are executed in no sequential order. The embodiment is described for the CAMC of one port, in practical application, when the LRP application writes the common attribute information into the applicant database of the LRP by using the CAMC of the port, the LRP synchronizes a changed record of the applicant database to a neighbor registrar database, and the CAMC corresponding to the neighbor registrar database reports the common attribute information to all LRP applications corresponding to the CAMC.

Figure 7:
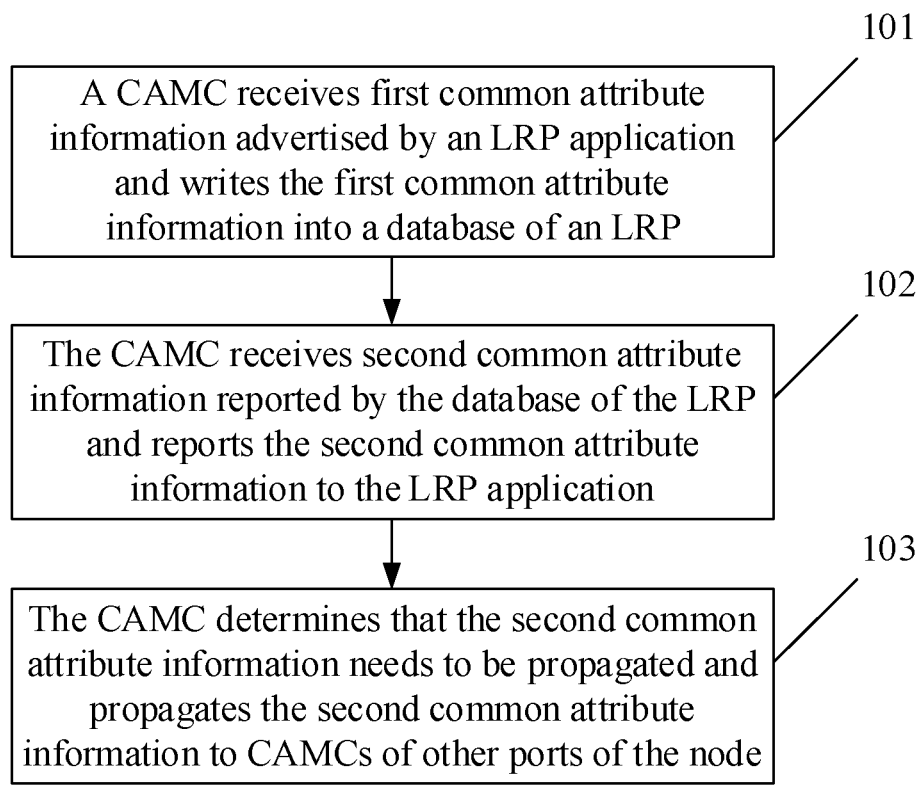
FIG. 7 is a flow chart of a method for advertising information in a bridge network of another embodiment of the present disclosure.

As shown in FIG. 7, in one embodiment, after the step 102, the method further includes following step.

In step 103, the CAMC determines whether the second common attribute information needs to be propagated and propagates the second common attribute information to CAMCs of other ports of the node.

It may be determined whether the second common attribute information needs to be propagated by querying a CAMC attribute propagation flag table (CPFT).

The CPFT is located in the CAMC and may be configured by the LRP application or statically configured by a user.

Figure 8:
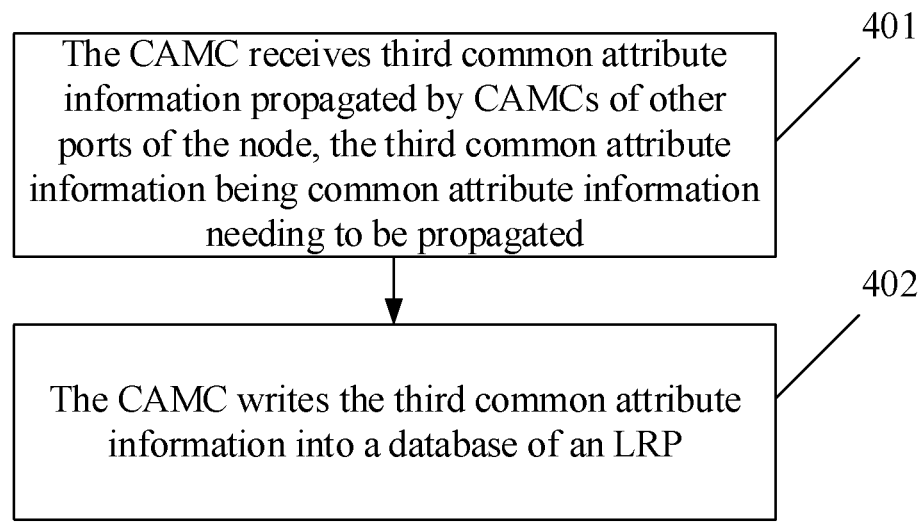
FIG. 8 is a flow chart of implementing propagation in the method for advertising information in a bridge network of some embodiments of the present disclosure.

As shown in FIG. 8, in one embodiment, the method further includes following steps.

In step 401, the CAMC receives third common attribute information propagated by CAMCs of other ports of the node, the third common attribute information being common attribute information needing to be propagated.

The step corresponds to the step 103, and the third common attribute information is the common attribute information propagated to the port by other ports.

In step 402, the CAMC writes the third common attribute information into the database of the LRP.

After the step 402, the database of the local LRP is updated, then the CAMC receives the third common attribute information sent from the database of the LRP, and the CAMC sends the third common attribute information to all LRP applications of the port.

Figure 9:
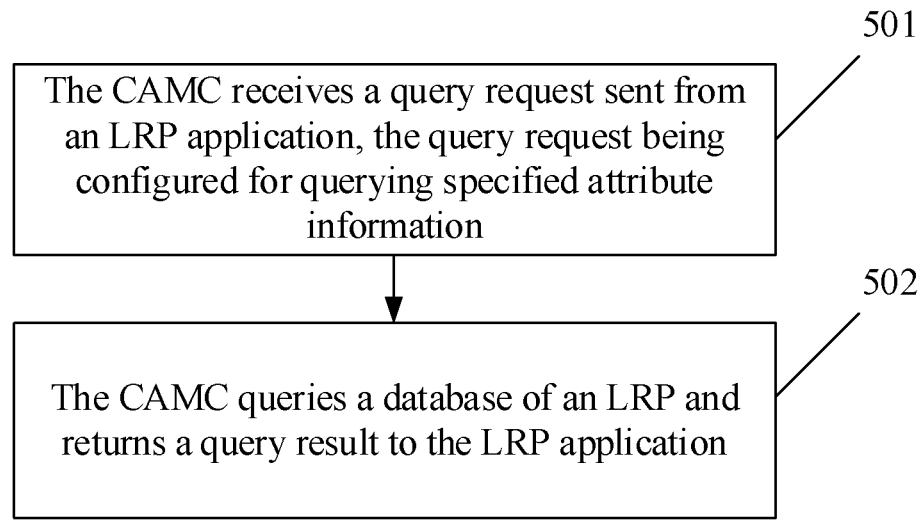
FIG. 9 is a flow chart of implementing query in the method for advertising information in a bridge network of some embodiments of the present disclosure.

As shown in FIG. 9, in one embodiment, the method further includes following steps.

In step 501, the CAMC receives a query request sent by the LRP application, the query request being used for querying specified attribute information.

In one embodiment, the CAMC receives the query request sent by the LRP application by using a CAMC query service primitive.

In step 502, the CAMC queries the database of the LRP and returns a query result to the LRP application.

In one embodiment, the step 502 includes following steps.

The CAMC calls an LRP database query primitive to query the database of the LRP, to acquire the attribute information; and the CAMC determines the query result according to the attribute information and a filtering strategy, and returns the query result to the LRP application.

Figure 10:
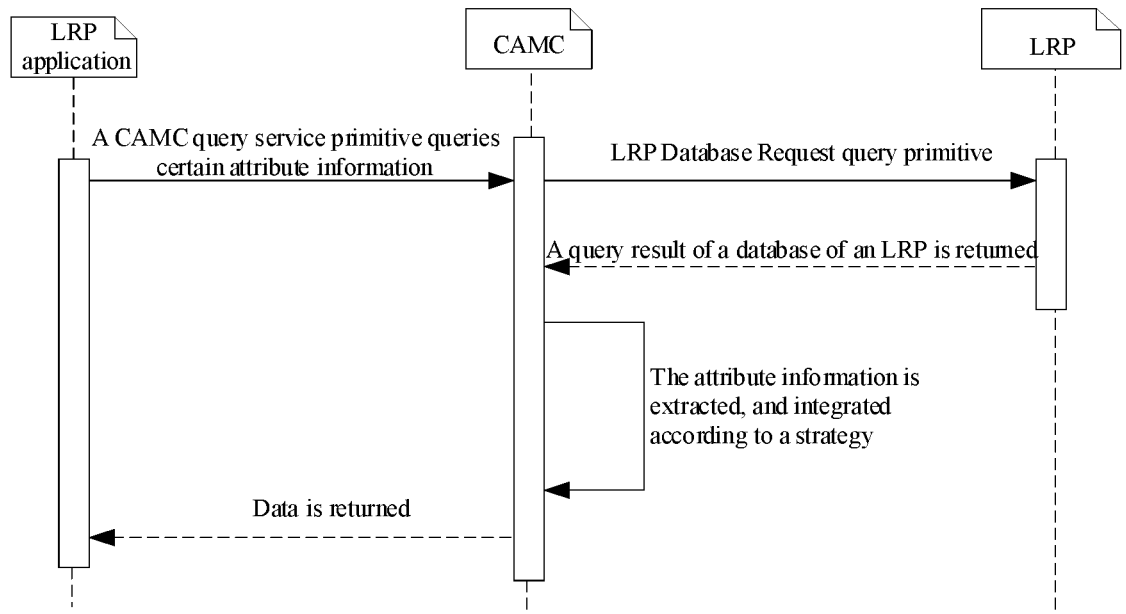
FIG. 10 is a query sequence chart of some embodiments of the present disclosure.

When the LRP application provides query service, the CAMC is used as an under layer, the LRP needs to provide a LRP database request primitive that strips contents of a record ID, a checksum, a sequenceNum, etc. to return data contents of the database record. The general query sequence chart is shown in FIG. 10, and the flow is as follows.

The LRP application calls the CAMC query service primitive to query certain attribute information, including whether the port has advertised the attribute information and the attribute information advertised to the port by other ports.

The CAMC calls the LRP database request query primitive to query the database of the LRP.

The database of the LRP returns a database query result, that is, record application data information carrying the attribute information.

The CAMC extracts the attribute information, and filters and integrates the attribute information according to a certain strategy (for example, the attribute of a certain node or port, or all attributes of nodes in a whole field is filtered, or whether the port has advertised the attribute is marked according to application requirements of the upper layer LRP).

The CAMC returns a query result to the upper LRP application.

Figure 11:
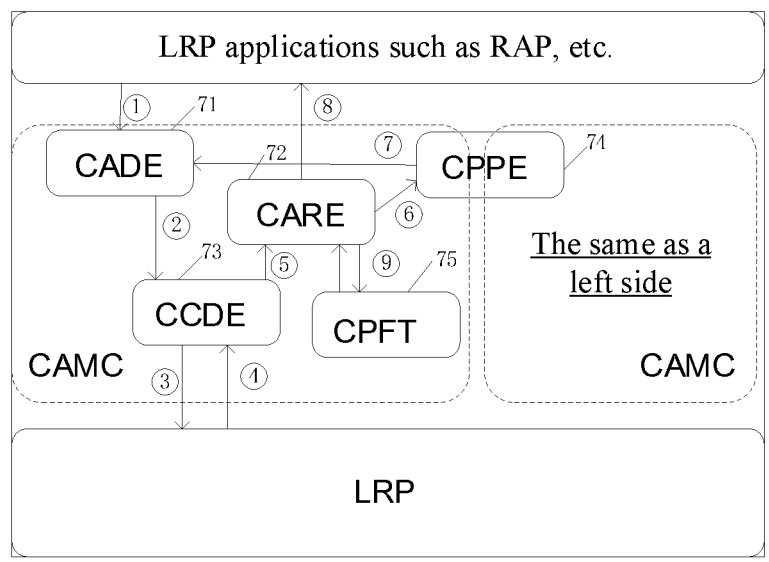
FIG. 11 is a schematic diagram of composition of the CAMC of some embodiments of the present disclosure.

As shown in FIG. 11, the CAMC of some embodiments of the present disclosure includes the following several components, and functions and a mutual collaboration flow of the components are as follows.

A CAMC attribute declaration entity (CADE) 71 is a per-portal component, processes common attribute declaration events on the Portal, and is triggered by attributes registered from other ports on the bridge by using a CAMC attribute propagation and processing entity (CPPE) 74 (⑦ in the diagram), or triggered by the CAMC service request primitive issued by applications of RAP, etc. (① in the diagram). Output of the CADE is transmitted to a CAMC coding and decoding entity (CCDE) 73 (② in the diagram).

A CAMC attribute registration entity (CARE) 72 is a per-portal component, processes common attribute registration events occurring on a Portal, and is triggered by receiving attributes from CCDE 73 (⑤ in the diagram). Output of the CARE 72 is transmitted to applications of RAP, etc. (⑧ in the diagram), and the CPFT (⑨ in the figure) is queried to determine whether the output needs to be propagated by using the CPPE 74 (⑥ in the diagram).

The CCDE 73 is a per-portal component, codes the CAMC attribute in a corresponding TLV format and sends the coded CAMC attribute to the LRP (③ in the diagram) or receives information from the LRP and decodes the TLV (④ in the diagram).

The CPPE 74 is a per-bridge component, and propagates attribute declarations between per-portal CAMCs, and one CPPE 74 is shared by all ports of each node.

A CAMC attribute propagation flag table (CPFT) 75 indicates whether attribute registration declarations received by the port need to be propagated to other ports by using the CPPE 74. The CPFT is configured by the LRP application or statically configured by the user.

In some embodiments of the present disclosure, the CADE 71 is used for receiving first common attribute information advertised by the LRP application and sending the first common attribute information to the CCDE 73.

The CCDE 73 is configured to encapsulate the first common attribute information into a TLV format and write the first common attribute information with the TLV encapsulation format into the database of the LRP. The CCDE 73 is further configured to receive second common attribute information with a TLV encapsulation format reported by the database of the LRP, decapsulate the second common attribute information with the TLV encapsulation format, and send the decapsulated second common attribute information to the CARE 72.

The CARE 72 is configured to report the second common attribute information to the LRP application.

The first common attribute information is common attribute information needing to be advertised by the LRP application, and the second common attribute information is common attribute information needing to be synchronized when the database of the LRP is changed.

In one embodiment, the CARE 72 is further configured to send the second common attribute information to the CPPE 74 in response that it is determined that the second common attribute information needs to be propagated by querying the CPFT 75.

The CPPE 74 is configured to propagate the second common attribute information to CADEs in CAMCs of other ports of the node.

In one embodiment, the CADE 71 is further configured to receive third common attribute information propagated by the CPPE 74 and send the third common attribute information to the CCDE 73, the third common attribute information being common attribute information needing to be propagated.

The CCDE 73 is further configured to encapsulate the third common attribute information into a TLV format and write the third common attribute information with the TLV format into the database of the LRP.

In one embodiment, the CADE 71 is further configured to receive a query request sent from the LRP application and send the query request to the CCDE 73, the query request being used for querying specified attribute information.

The CCDE 73 is further configured to encapsulate the query request into a TLV format, query the database of the LRP to acquire the attribute information, and send the attribute information to the CARE 72.

The CARE 72 is further configured to determine a query result according to the attribute information and a filtration strategy and return the query result to the LRP application.

Figure 12:
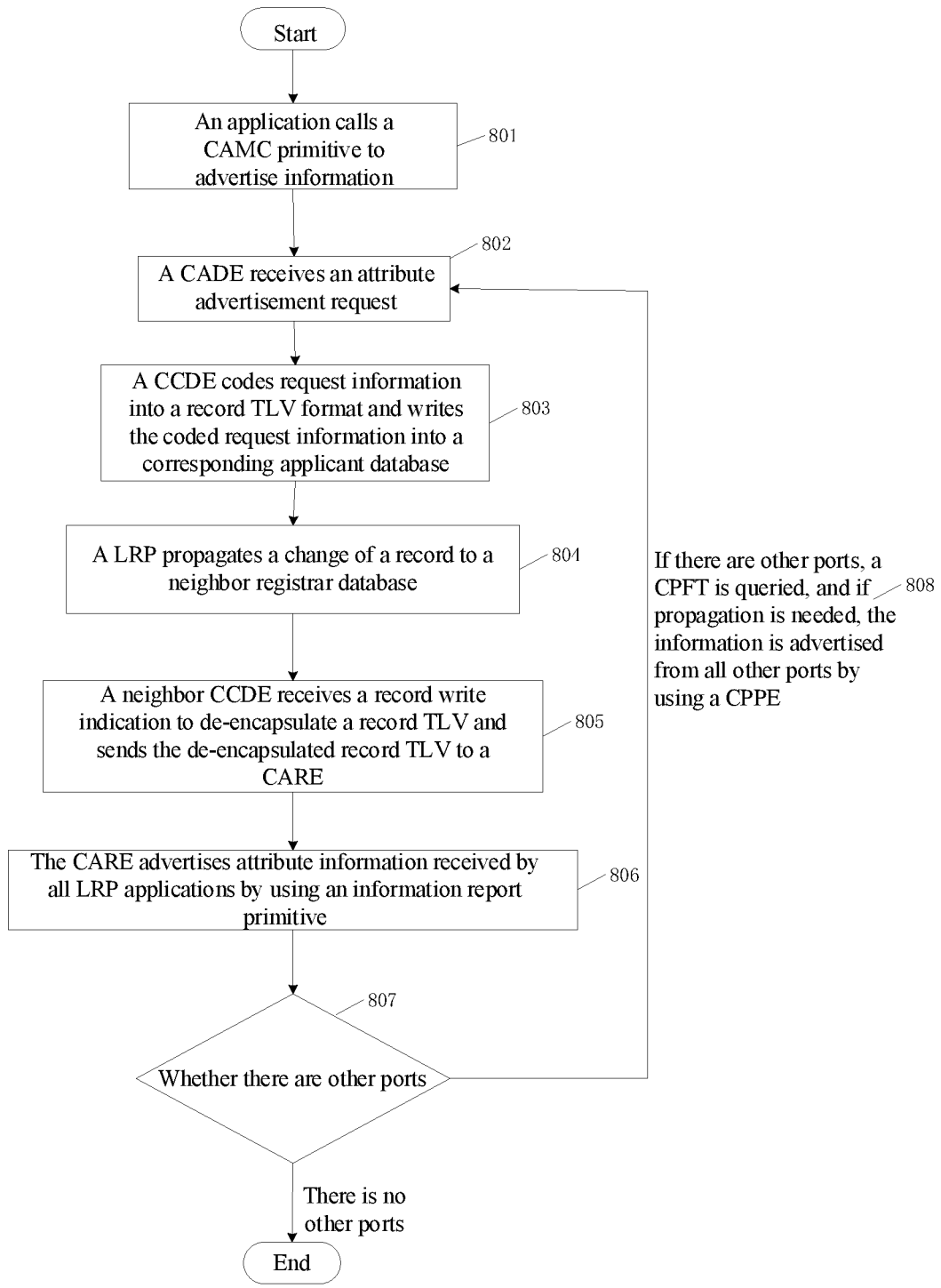
FIG. 12 is a flow chart that the LRP application advertises attribute information by the CAMC of some embodiments of the present disclosure.

As shown in FIG. 12, the flow of advertising the attribute information by the LRP application by using the CAMC includes following steps.

In step 801, the LRP application advertises the attribute information by calling the CAMC information advertisement service primitive.

In step 802, the CADE, which is responsible for information advertisement inside the CAMC, sends request information together with information of the port to the CCDE.

In step 803, the CCDE encapsulates the information into the TLV format, and calls the LRP write record request primitive to write attributes into the applicant database.

In step 804, the LRP synchronizes the changed record of the applicant database to the neighbor registrar database.

In step 805, the change of the neighbor registrar database is reported to the neighbor CCDE by using an LRP record write indication primitive.

In step 806, the neighbor CCDE performs TLV encapsulation on the received information to obtain the attribute information, and sends the attribute information to the CARE, and the CARE reports the attribute information to all LRP applications by using a CAMC information report primitive.

In step 807, whether there are other ports is determined, if not, the flow is ended, and if yes, step 808 is executed.

In step 808, the CARE queries the CPFT to query whether the attribute needs to be propagated, if yes, an attribute advertisement request is sent to the CPPE, the CPPE further requests CADEs of CAMCs of other ports to advertise the attribute, and the step 801 is executed back.

In the embodiments of the present disclosure, the common attribute information is uniformly transmitted and propagated by using the CAMC, such that on one hand, a plurality of LRP applications may share the common attribute information without additional definition, and on the other hand, when a plurality of LRP applications on the same port need to advertise the same common attribute information, the same common attribute information only needs to be advertised once, thereby avoiding waste of resources.

Some application examples are described below.

First Application Example

Figure 13:
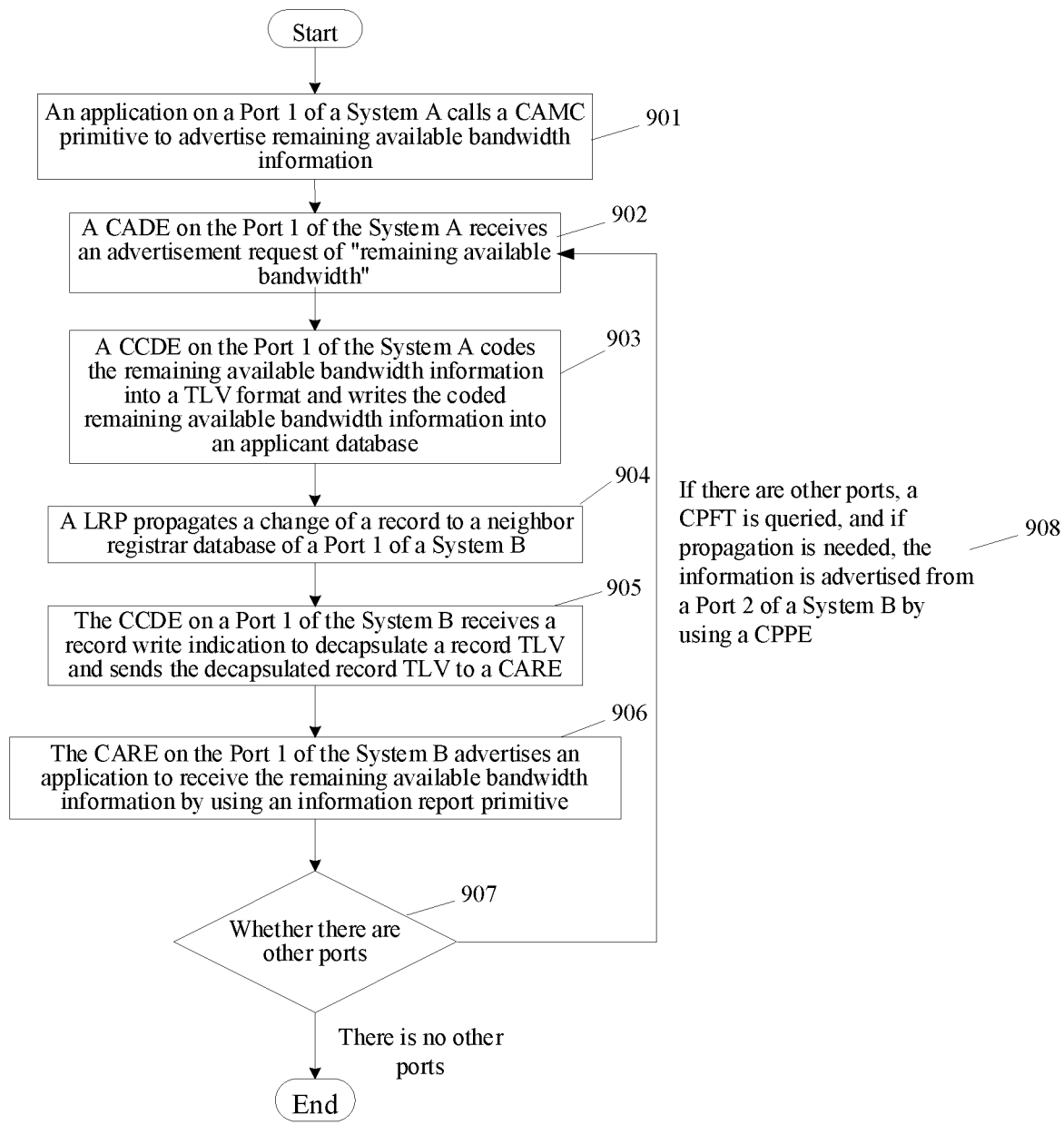
FIG. 13 is a flow chart of a first application example of the present disclosure.

The application example illustrates the flow of using a CAMC to advertise information, which is as shown in FIG. 13. It is assumed that there are two devices: system A and System B, a port 1 of the system A and a port 1 of the system B establish portal association for a CAMC, the system B is provided with two ports, the other port is a port 2. RAP requests the CAMC to advertise information of "remaining available bandwidth of the port 1 of the system A", a CPFT of the port 1 of the system B configures that this information needs to be propagated, and thus the advertisement flow is as follows.

In step 901: an application on the port 1 of the system A calls a CAMC primitive to advertise "remaining available bandwidth".

In step 902: a CADE on the port 1 of the system A receives an advertisement request primitive of "remaining available bandwidth", where an advertisement attribute is a remaining available bandwidth value.

In step 903: the CADE sends a request to a CCDE, where a content of the request is <System A, port 1, advertisement type (it is assumed that Type 001 represents the remaining available bandwidth), value>, a CCDE encapsulates the request into a TLV format, and calls an LRP write record request primitive to write the TLV into a record of an applicant database of the portal corresponding to the port 1 of the System A.

In step 904, an LRP synchronizes the change of the record of the port 1 of the System A to a registrar database of the port 1 of the System B by using a record LRPDU, and then advertises the change of the record to the CCDE of the port 1 of the System B by using an LRP record write indication primitive.

In step 905: the CCDE on the port 1 of the System B decapsulates the TLV contained in the received record and sends the decapsulated record to a CARE.

In step 906: the CARE on the port 1 of the System B advertises the remaining available bandwidth value of the port 1 of the System A obtained by resolution to a RAP application and other LRP applications on the System B by using an information report primitive.

In step 907: the CARE on the port 1 of the System B receives "remaining available bandwidth information of the port 1 of the System A", and determines whether there are other ports, if not, the flow is ended, and if yes, step 908 is executed.

In step 908, the CARE queries the CPFT and finds that propagation is needed, and advertises the information to the CADE of the port 2 of the System B by using a CPPE, where the flow for further advertisement of the CADE of the port 2 of the System B is the same as that in steps 902-907.

Figure 14:
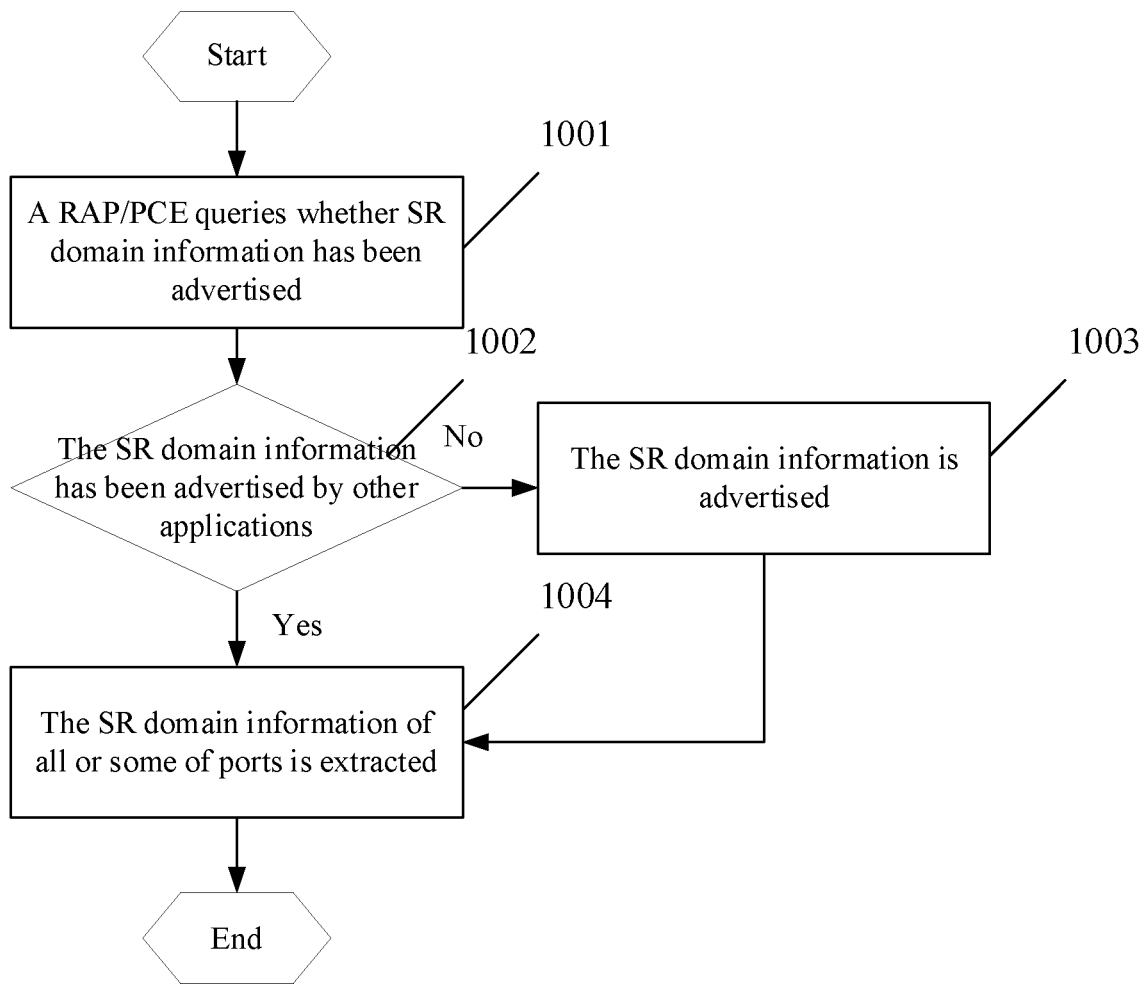
FIG. 14 is a flow chart of a second application example of the present disclosure.

Second Application Example:

The application example illustrates the work flow when a plurality of applications advertise the same information by using a CAMC, which is as shown in FIG. 14. It is assumed that both RAP and PCE need to advertise SR class information of a port by using the CAMC, it is assumed that this attribute is not advertised previously, and the work flow is as follows.

In step 1001, the RAP queries whether the SR Class information of the port is advertised by calling a query service primitive provided by the CAMC (advertised attributes are recorded in an applicant database of a portal).

In step 1002, the CAMC query service primitive determines whether the SR class information has been advertised by other applications, if not, step 1003 is executed, and if yes, step 1004 is executed.

In step 1003, the CAMC return indicating that the information of the port is not advertised, the RAP uses the flow in the first application example to advertise the SR Class information of the port, and other device ports use the same manner to advertise the SR Class information of each port to the port.

In step 1004, the RAP queries the SR Class information (which may be SR Class information of all or some of ports) recorded in the associated portal by using the query service primitive provided by the CAMC, and establishes an SR domain (and then performs resource allocation according to the SR domain).

In order to advertise the SR Class information of the port, the PCE calls the CAMC query service primitive, and then returns data indicating that the attribute of the port has been advertised, so the SR Class information of the port does not need to be repeatedly advertised, and returned output carries the advertised SR Class information of each port in the network, thereby establishing the SR domain (path computation may be performed according to SR domain information subsequently).

The following SR domain information illustrates a TLV coding format, which is as shown in FIG. 15(a).

A Type field is 2 bytes, a Length is 2 bytes, and a value of the Length field specifies the number of bytes occupied by a Data Value field. It is specified that SR domain information, Type value and occupied bytes need to be advertised as follows, and each TLV format is as shown in FIG. 15(b).

SRclassId: Type=1, Length=1 byte
SRclassPriority: Type=2, Length=1 byte
TransmissionSelectioin: Type=3, Length=1 byte
ClassMeasureInterval: Type=4, Length=1 byte
SRClassMaxFrameSize: Type=5, Length=2 bytes
SRClassTargetMaxLatency: Type=6, Length=4 bytes As shown in FIG. 2, an application data field may carry a maximum size of data of 65520 bytes, and thus one record may carry a plurality of TLVs. For example, the TLV for advertising the SR domain information may each be carried by using one Record. The CCDE of the CAMC of the embodiment of the present disclosure is responsible for coding and decoding each common attribute TLV.

Some embodiments of the present disclosure further provide a device for advertising information in a bridge network. The device includes a memory, a processor and a computer program stored in the memory and executable by the processor, where the processor implements the method for advertising information in a bridge network when executing the computer program.

Some embodiments of the present disclosure further provide a computer-readable storage medium. The computer-readable storage medium stores a computer-executable instruction, where the computer-executable instruction is used for executing the method for advertising information in a bridge network.

In some embodiments, the above storage medium may include, but is not limited to, various media that may store program codes, such as a USB flash disk, a Read-Only Memory (ROM), a Random Access Memory (RAM), a mobile hard disk, a magnetic disk, or an optical disk.

It may be understood by a person of ordinary skill in the art that all or some of the steps and functional modules/units in the system and the apparatus disclosed in the method above may be implemented as software, firmware, hardware and appropriate combinations thereof. In an implementation manner of hardware, division between the functional modules/units mentioned in the above description does not necessarily correspond to division of physical components. For example, a physical component may have a plurality of functions, or a function or a step may be cooperatively executed by several physical components. Some or all of the components may be implemented as software executed by the processor, such as a digital signal processor or a microprocessor, or as hardware, or as an integrated circuit, such as an application-specific integrated circuit. Such software may be distributed on the computer readable medium, which may include a computer storage medium (or a non-transitory medium) and a communication medium (or a transitory medium). As well known to a person of ordinary skill in the art, the term computer storage medium includes volatile, nonvolatile, removable and non-removable media implemented in any method or technology for storing information (such as a computer readable instruction, a data structure, a program module or other data). The computer storage medium includes, but is not limited to, the RAM, the ROM, an electrically erasable programmable read-only memory (EEPROM), a flash memory or other memory technologies, a compact disc read-only memory (CD-ROM), a digital versatile disc (DVD) or other optical disk storages, magnetic cassettes, magnetic tapes, magnetic disk storages or other magnetic storage apparatuses, or any other medium that may be used to store desired information and may be accessed by computers. Furthermore, it is well known to a person of ordinary skill in the art that the communication medium typically contains the computer readable instruction, the data structure, the program module or other data in, for example, a carrier wave or a modulated data signal of other transmission mechanisms, and may include any information delivery medium.

What is claimed is:

1. A method for advertising information in a bridge network, wherein a common attributes management component (CAMC) is configured between a link-local registration protocol (LRP) application and an LRP at each port of each node of the bridge network, the method comprising:
   receiving, by the CAMC, first common attribute information advertised by the LRP application and writing the first common attribute information into a database of the LRP;
   receiving, by the CAMC, second common attribute information reported by the database of the LRP and reporting the second common attribute information to the LRP application; and
   propagating, by the CAMC, the second common attribute information to CAMCs of other ports of the node, in response to the CAMC determining that the second common attribute information needs to be propagated;
   wherein the first common attribute information is common attribute information needing to be advertised by the LRP application, and the second common attribute information is common attribute information needing to be synchronized when the database of the LRP is changed.

2. The method according to claim 1, wherein the receiving, by the CAMC, the first common attribute information advertised by the LRP application and writing the first common attribute information into the database of the LRP comprises:
   receiving, by the CAMC, the first common attribute information advertised by the LRP application by using a CAMC information advertisement service primitive; and
   encapsulating, by the CAMC, the first common attribute information into a type-length-value (TLV) format and calling an LRP write record request primitive to write the first common attribute information into an applicant database of the LRP.

3. The method according to claim 2, wherein the first common attribute information and information of the port are encapsulated together and sent to the applicant database of the LRP during encapsulation.

4. The method according to claim 1, wherein the receiving, by the CAMC, the second common attribute information reported by the database of the LRP and reporting the second common attribute information to the LRP application comprises:
   receiving, by the CAMC, the second common attribute information with a TLV encapsulation format reported by a registrar database of the LRP by using an LRP record write indication primitive; and
   decapsulating, by the CAMC, the second common attribute information with the TLV encapsulation format and reporting the second common attribute information to all LRP applications of the port by using a CAMC information report primitive.

5. The method according to claim 1, wherein the CAMC determining that the second common attribute information needs to be propagated comprises:
   determining that the second common attribute information needs to be propagated by querying a CAMC attribute propagation flag table (CPFT).

6. The method according to claim 1, wherein the method further comprises:
   receiving, by the CAMC, third common attribute information propagated by the CAMCs of other ports of the node, the third common attribute information being common attribute information needing to be propagated; and
   writing, by the CAMC, the third common attribute information into the database of the LRP.

7. The method according to claim 1, wherein the method further comprises:
   receiving, by the CAMC, a query request sent from the LRP application, the query request being configured for querying specified attribute information; and
   querying, by the CAMC, the database of the LRP and returning a query result to the LRP application.

8. The method according to claim 7, wherein the receiving, by the CAMC, the query request sent from the LRP application comprises: receiving, by the CAMC, the query request sent from the LRP application by using a CAMC query service primitive; and the querying, by the CAMC, the database of the LRP and returning the query result to the LRP application comprises:

calling, by the CAMC, an LRP database query primitive to query the database of the LRP to acquire the attribute information; and determining, by the CAMC, the query result according to the attribute information and a filtration strategy and returning the query result to the LRP application.

9. A common attributes management component (CAMC) configured between an LRP application and an LRP at a port of a node of a bridge network, the CAMC comprising:

a CAMC attribute declaration entity (CADE), a CAMC coding and decoding entity (CCDE), a CAMC attribute registration entity (CARE), a CAMC attribute propagation flag table (CPFT), and a CAMC attribute propagation and processing entity (CPPE), wherein one CPPE is shared by all ports of each node;

wherein:

the CADE is configured to receive first common attribute information advertised by the LRP application and send the first common attribute information to the CCDE;

the CCDE is configured to:

encapsulate the first common attribute information into a TLV format, write the first common attribute information with the TLV format into a database of the LRP, receive second common attribute information with a TLV encapsulation format reported by the database of the LRP, decapsulate the second common attribute information with the TLV encapsulation format, and send decapsulated second common attribute information to the CARE;

the CARE is configured to report the second common attribute information to the LRP application;

the CARE is further configured to send the second common attribute information to the CPPE in response that it is determined that the second common attribute information needs to be propagated by querying the CPFT;

the CPPE is configured to propagate the second common attribute information to CADEs in CAMCs of other ports of the node;

the first common attribute information is common attribute information needing to be advertised by the LRP application; and the second common attribute information is common attribute information needing to be synchronized when the database of the LRP is changed.

10. The CAMC according to claim 9, wherein:

the CADE is further configured to receive third common attribute information propagated by the CPPE and send the third common attribute information to the CCDE, the third common attribute information being common attribute information needing to be propagated; and the CCDE is further configured to encapsulate the third common attribute information into a TLV format and write the third common attribute information with the TLV format into the database of the LRP.

11. The CAMC according to claim 9, wherein the first common attribute information and information of the port are encapsulated together and sent to the applicant database of the LRP during encapsulation.

12. The CAMC according to claim 9, wherein:

the CADE is further configured to receive a query request sent from the LRP application and send the query request to the CCDE, the query request being configured for querying specified attribute information;

the CCDE is further configured to encapsulate the query request into a TLV format, query the database of the LRP to acquire the attribute information, and send the attribute information to the CARE; and the CARE is further configured to determine a query result according to the attribute information and a filtration strategy, and return the query result to the LRP application.

13. A device for advertising information in a bridge network, the device comprising a memory, a processor, and a computer program stored in the memory and executable by the processor, wherein the processor, when executing the computer program, is configured to implement a method for advertising information in a bridge network, wherein the method is applied at a common attributes management component (CAMC) configured between a link-local registration protocol (LRP) application and an LRP at each port of each node of the bridge network, the method comprising:

receiving first common attribute information advertised by the LRP application and writing the first common attribute information into a database of the LRP;

receiving second common attribute information reported by the database of the LRP and reporting the second common attribute information to the LRP application; and propagating the second common attribute information to CAMCs of other ports of the node, in response to the CAMC determining that the second common attribute information needs to be propagated;

wherein the first common attribute information is common attribute information needing to be advertised by the LRP application, and the second common attribute information is common attribute information needing to be synchronized when the database of the LRP is changed.

14. The device according to claim 13, wherein the receiving first common attribute information advertised by the LRP application and writing the first common attribute information into the database of the LRP comprises:

receiving the first common attribute information advertised by the LRP application by using a CAMC information advertisement service primitive; and encapsulating the first common attribute information into a type-length-value (TLV) format and calling an LRP write record request primitive to write the first common attribute information into an applicant database of the LRP.

15. The device according to claim 14, wherein the first common attribute information and information of the port are encapsulated together and sent to the applicant database of the LRP during encapsulation.

16. The device according to claim 13, wherein the receiving second common attribute information reported by the database of the LRP and reporting the second common attribute information to the LRP application comprises:

receiving the second common attribute information with a TLV encapsulation format reported by a registrar database of the LRP by using an LRP record write indication primitive; and decapsulating the second common attribute information with the TLV encapsulation format and reporting the second common attribute information to all LRP applications of the port by using a CAMC information report primitive.

17. The device according to claim 13, wherein the CAMC determining that the second common attribute information needs to be propagated comprises:
   determining that the second common attribute information needs to be propagated by querying a CAMC attribute propagation flag table (CPFT).

18. The device according to claim 13, wherein the method further comprises:
   receiving third common attribute information propagated by CAMCs of other ports of the node, the third common attribute information being common attribute information needing to be propagated; and
   writing the third common attribute information into the database of the LRP.

19. The device according to claim 13, wherein the method further comprises:
   receiving a query request sent from the LRP application, the query request being configured for querying specified attribute information; and
   querying the database of the LRP and returning a query result to the LRP application.

20. The device according to claim 19, wherein the receiving the query request sent from the LRP application comprises: receiving, by the CAMC, the query request sent from the LRP application by using a CAMC query service primitive; and
   the querying the database of the LRP and returning the query result to the LRP application comprises:
      calling an LRP database query primitive to query the database of the LRP to acquire the attribute information; and
      determining the query result according to the attribute information and a filtration strategy and returning the query result to the LRP application.

\* \* \* \* \*